June 5, 1923.
A. B. MYERS
1,457,545
BRAKE RETAINER
Filed Nov. 29, 1921
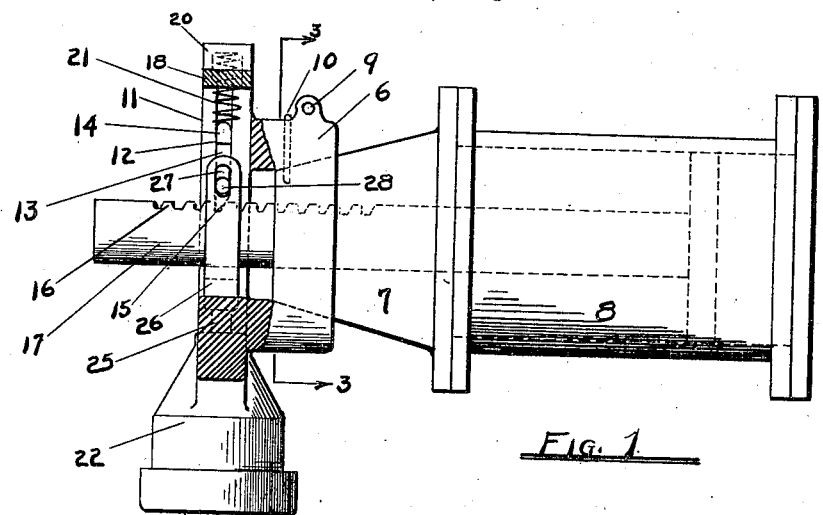
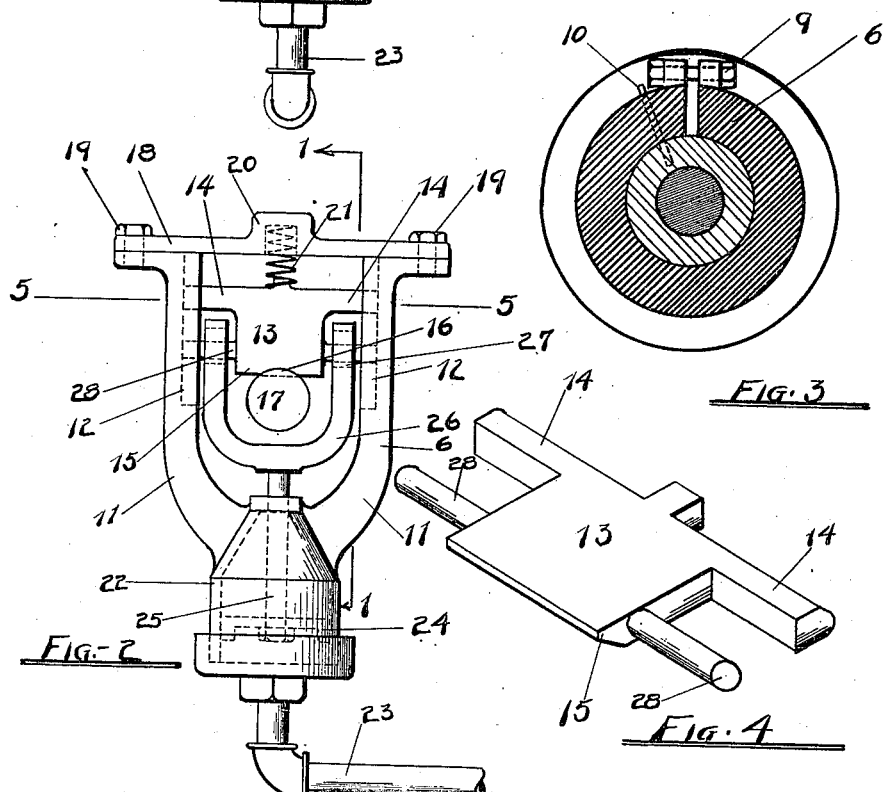
INVENTOR
ALFRED B. MYERS
BY C. F. Blake
ATTY.

Patented June 5, 1923.

1,457,545

UNITED STATES PATENT OFFICE.

ALFRED B. MYERS, OF GATES, OREGON.

BRAKE RETAINER.

Application filed November 29, 1921. Serial No. 518,595.

*To all whom it may concern:*

Be it known that I, ALFRED B. MYERS, a citizen of the United States, residing at Gates, Marion County, State of Oregon, have invented certain new and useful Improvements in Brake Retainers, of which the following is a specification.

My device relates to brake retainers in general, and particularly to such retainers as are useful in combination with the air brake apparatus of railroad trains, and is so illustrated in the accompanying drawing.

The object of my invention is to provide a device that will retain the brakes in service or set condition indefinitely after they have been once set by the application of air in the regular manner, and that may be released by application of air to my device; a further object is to provide such a device that the action thereof is entirely independent of the air service of the train.

I accomplish the above objects by means of the construction illustrated in the accompanying drawing, which is a part of this application for Letters Patent, like characters of reference indicating like parts throughout the several views thereof, and in which:

Fig. 1 is a side elevation of an air brake cylinder with my device mounted thereupon, parts being broken away to illustrate the construction.

Fig. 2 is an end elevation of the subject matter of Fig. 1.

Fig. 3 is a sectional elevation upon the line 3—3 of Fig. 1.

Fig. 4 is a perspective view of the dog.

Fig. 5 is a section upon line 5—5 of Fig. 2.

In general my device consists of means of mounting a dog upon the end of a brake cylinder, said dog being adapted for engaging with teeth upon the brake cylinder piston rod, and pneumatically operated means for releasing said dog when desired.

The mounting for the dog consists of a collar 6 adapted to fit upon the end 7 of the brake cylinder 8, and secured thereupon by a clamping bolt 9 and a dowel 10. Integrally constructed with said collar are a pair of vertically disposed arms 11, one arm upon each side of the axis of the brake cylinder, each arm being provided with slots or guideways 12 upon its inner face.

The dog 13 is provided with lugs 14 adapted to slide within their respective slots or guideways 11, and a beveled edge 15 adapted to engage with suitable teeth 16 upon the brake cylinder piston rod 17.

A cap 18 connects the upper ends of the arms 11, being secured to each arm by suitable bolts 19. Said cap is provided with a pocket 20 within which pocket is disposed a spring 21, said spring being adapted to keep the dog 13 normally in engagement with the teeth 16.

When the brakes are set by the application of compressed air to the cylinder 8, the piston rod 17 moves outward therefrom, the beveled edge 15 of the dog allowing the latter to slip from tooth to tooth upon the piston rod in ratchetlike manner. When the brakes are set the dog 13 engages one of the teeth 16, and thereby retains the brakes in set position irrespective of whether or not the air pressure is retained within the cylinder 8. This is accomplished automatically as the brakes are set, and the locomotive may be uncoupled from the car or train leaving the brakes securely locked in set position, with no possibility of their becoming unlocked by reason of any leakage of air from the cylinder 8 or any other portion of the air brake system upon the car or train.

It is necessary to provide some means whereby the dogs 13 upon the cars coupled together in a train standing with the brakes set and secured by my device may all be simultaneously released by the engineer upon the locomotive when the latter is again coupled to the train.

This I accomplish by providing an air cylinder 22 constructed integral with the arms 11 and connected by a pipe 23 to a suitable air controlling valve (not shown) located in the locomotive cab, whereby the engineer may cause compressed air to enter the cylinder 22. Within this cylinder is a piston 24 connected to a piston rod 25, which projects upward beyond the cylinder 22 terminating in a fork 26. The ends of said fork are slotted, as shown at 27, to receive trunnions 28 upon the dog 13. Said slots 27 allow the dog to move vertically sufficiently to clear the teeth 16 as the dog rides over said teeth ratchetlike, but when air is admitted under pressure into the cylinder 22 the resultant raising of the fork 26 causes the dog to be raised out of engagement with the teeth 16 because of the contacting of the trunnions 28 with the lower end of the slots 27. When so released the brake mechanism returns to the free position in the manner common to such mechanisms.

It is thus obvious that my device will operate automatically to engage with and hold the regular air brake mechanism in set position irrespective of the air condition within said mechanism, and that further, my device may be released at will by the engineer of a locomotive coupled to the train or car having my device installed thereon.

My device may be made of any size, and constructed of any material deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. An air brake cylinder for railroad cars in combination with gravity operated ratchetlike mechanism for retaining the brakes in set position independently of the air pressure in said cylinder, and pneumatically operated releasing mechanism for said ratchetlike mechanism.

2. A hub adapted to be clamped upon an air brake cylinder; vertically disposed guides upon said hub adapted to receive an air brake piston rod therebetween; a dog slidably mounted within said guides and adapted to engage teeth upon said piston rod; a cylinder mounted beneath said guides and alined therewith; a piston within said cylinder; a piston rod connecting said piston with said dog; and air admittance means connected to said cylinder.

3. A pair of vertically disposed guides adapted to be mounted upon an air brake cylinder with the air brake piston rod therebetween; a dog slidably mounted upon said guides and adapted to engage teeth upon said piston rod; and pneumatic means of releasing said dog.

4. A brake retaining mechanism adapted to be mounted upon an air brake cylinder and to coact with teeth upon the air brake piston rod to retain the latter in set position, comprising a cylinder; a piston within said cylinder; a piston rod; vertical guides upon said cylinder; a dog; trunnions upon said dog operating within said guides; a yoke upon said latter piston rod adapted to embrace said first mentioned piston rod and to engage certain of said trunnions; a cap connecting the ends of said guides; and a spring intermediate said cap and said dog.

5. A cylinder; diametrically disposed vertical guides upon said cylinder; a clamping hub adapted to mount said cylinder and said guides upon an air brake cylinder; and brake retaining mechanism mounted within said guides.

6. A pair of vertically disposed guides adapted to embrace an air brake piston rod, and terminating at the lower ends thereof in an air pressure cylinder; means to mount said guides upon an air brake cylinder; brake retaining mechanism mounted upon said guides; and means coacting with said air pressure cylinder and said brake retaining mechanism to release the latter when compressed air is admitted into the former.

In witness whereof I claim the foregoing as my own I hereunto affix my signature in the presence of two witnesses at Portland, county of Multnomah, State of Oregon, this 3rd day of Nov., 1921.

ALFRED B. MYERS.

Witnesses:
L. J. ROBINSON,
C. F. BLAKE.